United States Patent [19]
Koike et al.

[11] Patent Number: 5,400,686
[45] Date of Patent: Mar. 28, 1995

[54] SEQUENCER

[75] Inventors: Tsuyoshi Koike; Toshinori Matsuda, both of Shizuoka, Japan

[73] Assignee: Kabushika Kaisha Kawai Gakki Seisakusho, Japan

[21] Appl. No.: 982,878

[22] Filed: Nov. 30, 1992

[30] Foreign Application Priority Data

Feb. 27, 1992 [JP] Japan .................................. 4-075710

[51] Int. Cl.⁶ .............................................. G09B 15/02
[52] U.S. Cl. ................................................. 84/477 R
[58] Field of Search ............. 84/477 R, 478; 364/744; 345/145, 157

[56] References Cited
U.S. PATENT DOCUMENTS

4,694,723 9/1987 Shinohara et al. ................ 84/478 X
4,730,533 3/1988 Schoerkmayr ........................ 84/478
5,161,118 11/1992 Matsuda et al. ..................... 364/744

Primary Examiner—Stanley J. Witkowski
Attorney, Agent, or Firm—Andrus, Sceales, Starke & Sawall

[57] ABSTRACT

A sequencer according to the present invention comprises: a display having multiple data input fields for entry of information items and having a capability for distinguishing or emphasizing which of the data input fields is prepared to accept input; designating circuitry for selecting an operation mode; and a control for, when a specific operation mode is selected by the designating circuitry, facilitating the entry of information items by distinguishing or emphasizing one of the data input fields where information will most probably be entered in the specific operation mode.

5 Claims, 6 Drawing Sheets

```
ADDRESS              ┌40       ┌41  ┌45
      1   2   3   4 ⌠ 5   6   7 ⌠ 8   9 ⌠10  11  12  13  14  15  16
        ┌───┬───┬───┬───┬───┬───┬───┬───┬───┬───┬───┬───┬───┬───┬───┐
        │ S │ O │ N │ G │ 0 │ 0 │ 1 │   │   │   │   │   │   │   │   │
        ├───┼───┼───┼───┼───┼───┼───┼───┼───┼───┼───┼───┼───┼───┼───┤
        │ L │ o │ v │ e │ M │ e │ D │ o │   │   │   │ = │ 1 │ 2 │ 0 │
        └───┴───┴───┴───┴───┴───┴───┴───┴───┴───┴───┴───┴───┴───┴───┘
     17  18  19  20 ⌡21  22  23  24  25  26  27 ⌡28  29  30 ⌡30  32
ADDRESS           42⌠                       43⌠         44⌠
```

FIG. 6

SEQUENCER

BACKGROUND OF THE INVENTION

1. Field of the Invention

The present invention relates to a sequencer for an electronic musical instrument, and more particularly, to a technique for a sequencer that simplifies its data setup procedures by the integrated operation of its display device and its operation terminals.

Electronic musical instrument techniques have reached a high level of development, and electronic musical instruments are being manufactured that can exchange play information with external devices via interfaces that conform to, for example, the industry standards for MIDI (Musical Instrument Digital Interface). One such external device that is in practical use is a sequencer, a controller that reads recorded play information and feeds it to an electronic musical instrument, etc. that thereafter produces musical tones.

To record play information in a sequencer, or to retrieve recorded play information therefrom, various switches must be used to perform data setups. Because the procedures involved are complicated, a sequencer that can simplify data setups is desirable.

2. Description of the Related Art

A sequencer that is used with electronic musical instruments has a storage device for storing play information that it receives from an external device. To store play information for multiple musical pieces, this storage device is divided into a number of storage areas that are identified by individual numbers, "musical piece identification numbers."

When recording, play information that is supplied by, for example, an electronic musical instrument, is stored in a specified storage area identified by a musical piece identification number.

When reproducing, play information is read from a specified storage area that is identified by a musical piece identification number, and sent, for example, to an electronic musical instrument that uses it to reproduce musical tones. This reproduction can be performed at a desired tempo that is selected in advance.

Thus, for recording, the sequencer has to be set up to receive data for musical numbers, while for reproduction, the sequencer must be set up to transmit data for musical numbers and tempos. It should be noted that some sequencers, depending on their functions, may require other data setups; however, to simplify the explanation, a sequencer that needs only the previously described data setups will be described.

A conventional sequencer includes a display device, a cursor positioning switch, and a value change terminal to perform the above data setups.

Arranged on the display device are multiple data sets, each set consisting of a data identifier and a fixed value. In this example, a message set consisting of a musical piece identification number and its fixed value, and a message set consisting of a tempo and its fixed value are displayed on the display device.

To change a displayed musical piece identification number, for example, an operator uses a cursor positioning switch to move the cursor to a location where the current musical piece identification number is displayed, and then uses a value change terminal to display and set a desired, alternate musical piece identification number. The cursor remains at the location where the musical piece identification number is displayed.

Likewise, to change a tempo, the operator uses the cursor positioning switch to move the cursor to the location where the current tempo value is displayed, and then uses the value change terminal to display and set a desired, alternate tempo value. The cursor remains at the location where the tempo value is displayed.

As described above, because a conventional sequencer uses a display device, a cursor positioning switch, and a value change terminal to make data setups, the cursor must always be moved to the location where the fixed data value that is to be altered is displayed. These operations are overly complex and too time consuming.

SUMMARY OF THE INVENTION

To overcome such shortcomings, it is an object of the present invention to provide a sequencer that reduces the number of switch operations as much as possible, and that can easily and rapidly make data setups.

To achieve this object, a sequencer according to the present invention comprises:
- display means having multiple data input fields for entry of information items and having a capability for distinguishing or emphasizing which of these data input fields is prepared to accept input;
- designating means for selecting an operation mode; and
- control means for, when a specific operation mode is selected by the designating means, facilitating the entry of information items by distinguishing or emphasizing one of the data input fields where information will most probably be entered in the specific operation mode.

According to the present invention, to enter information items for a sequencer using display means having multiple data input fields, a distinguishing or emphasizing display, such as one wherein a cursor is used, is employed to designate which data input field is ready for information input in the current operation mode.

Since operator selection of a desired data input field is not necessary, i.e., operator selection of a desired input field using a cursor is eliminated, the number of switch operations, etc. is reduced, and easy and rapid input of diverse information items is possible.

DETAILED DESCRIPTION OF THE PREFERRED EMBODIMENT

Figure 1:
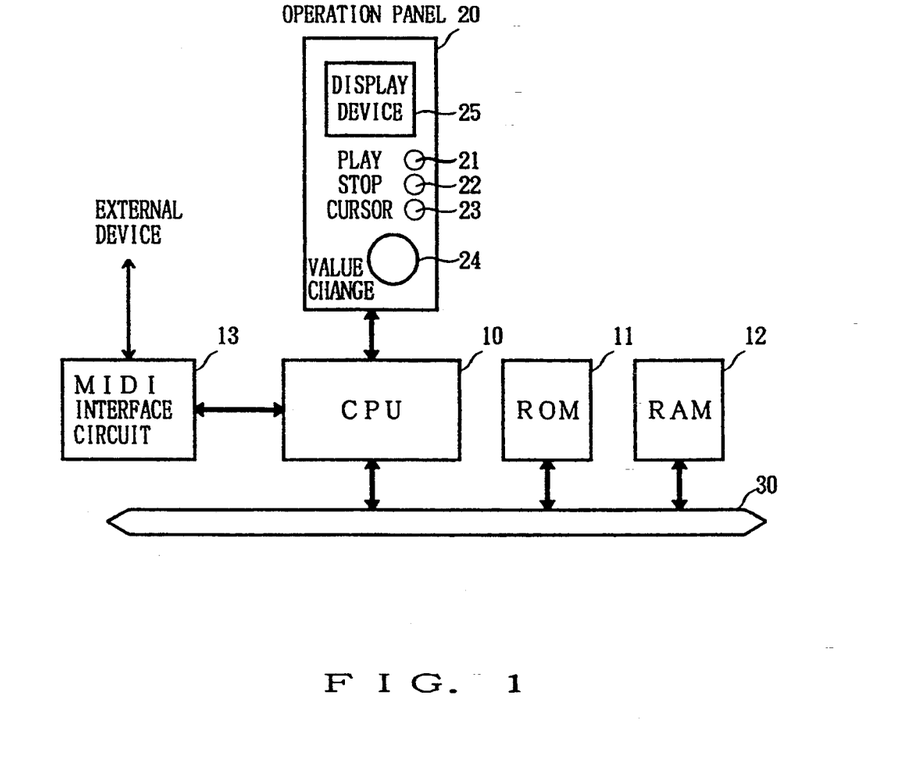
FIG. 1 is a schematic block diagram illustrating the general structure of one embodiment of a sequencer according to the present invention.

The preferred embodiment according to the present invention will now be described while referring to the accompanying drawings. FIG. 1 is a schematic block diagram showing the general structure of one embodiment of a sequencer according to the present invention.

A central processing unit (CPU) 10 controls the individual sections of the sequencer by executing the instructions included in a control program that is stored in a read only memory (ROM) 11.

In the ROM 11, besides the control program, various other fixed data to be used by the CPU 10 are stored. The ROM 11 is accessed by the CPU 10 through a system bus 30.

In a random access memory (RAM) 12 are defined a work area for the CPU 10, and various tables, registers, flags, etc. that are used to control the sequencer. Also located in the RAM 12 is a storage area for recording play information. Consonant with the musical piece capacity count, 100 in this example, this storage area is subdivided into storage sectors and such storage sectors are allocated unique musical piece identification numbers, 1 through 100 in this case.

Among the flags defined in the RAM 12 is a reproduction flag. This flag is used to indicate whether or not reproduction is in progress. If the value of the reproduction flag is "1", reproduction is in progress, while if it is "0", reproduction is not in progress.

The above described RAM 12 is accessed by the CPU 10 through the system bus 30.

A MIDI interface circuit 13 is disposed between an external device (not shown) and the CPU 10 for the exchange of play information. The external device employed in this case is an electronic musical instrument, such as an electronic piano, an electronic organ, or an electronic keyboard, that incorporates a MIDI interface function, and that supplies play information to the sequencer and produces musical tones based on play information it receives from the sequencer.

The MIDI interface circuit 13 is connected directly to the CPU 10, i.e., without using the system bus 30.

An operation panel 20 has a PLAY switch 21, a STOP switch 22, a cursor positioning switch 23, a value change terminal 24, and a display device 25. Note that in FIG. 1 only those components are shown that are necessary to explain the present invention.

The PLAY switch 21 is used to start reproduction. The STOP switch 22 is used to stop reproduction. The cursor positioning switch 23 is used to move a cursor which is displayed on the display device 25. The value change terminal 24, which is constituted by, for example, a rotary encoder, is used to change displayed information items (values).

The ON/OFF states of the individual switches and the setting state of the operation terminal on the operation panel 20 are detected by a scan circuit (not shown) and are sent to the CPU 10. The ON/OFF state information is stored in a predetermined area of the RAM 12 and is referred to when an event map, to be described later, is prepared. The setting state of the operation terminal is also stored in a predetermined area of the RAM 12 and is referred to as needed.

The display device 25, whereon characters, numbers, symbols, etc. can be displayed, is constituted by, for example, an LCD.

Figure 6:
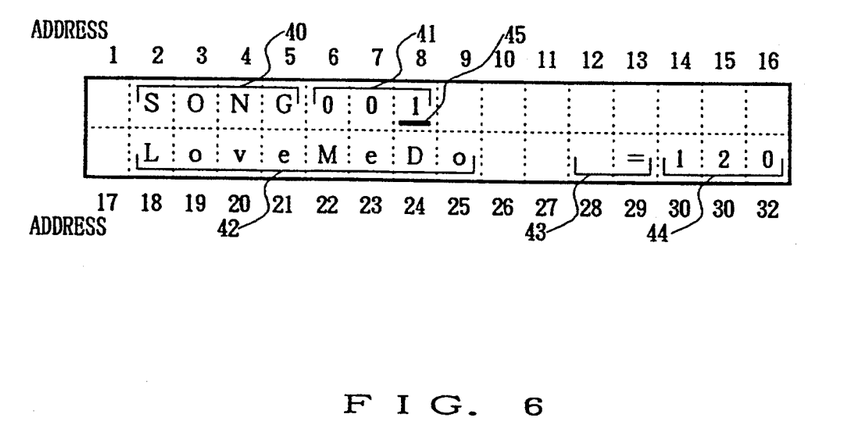
FIG. 6 is a diagram illustrating an example of the structure of a display device in the embodiment of the present invention.

As shown in the example in FIG. 6, "16 columns×2 rows", i.e., 32 characters, can be displayed on the display device 25. The character positions are designated by addresses of "1 to 32". Messages 40 to 44 in FIG. 6 indicate, respectively, a musical piece identification number, a musical piece identification number value (input field), a music title, a tempo, and a tempo value (input field). Reference number 45 denotes a cursor.

The display device 25 is controlled by information sent from the CPU 10. More specifically, the display device 25 displays data received from the CPU 10, i.e., addresses for designating display positions, and codes of characters, numbers, and symbols to be displayed at the addresses.

The CPU 10, the ROM 11, and the RAM 12 are mutually connected by the system bus 30.

With such an arrangement, the operation of the embodiment will now be explained while referring to the flowcharts shown in FIGS. 2 to 5. Only the reproduction operations that relate to the present invention will be explained using the flowcharts.

Figure 2:
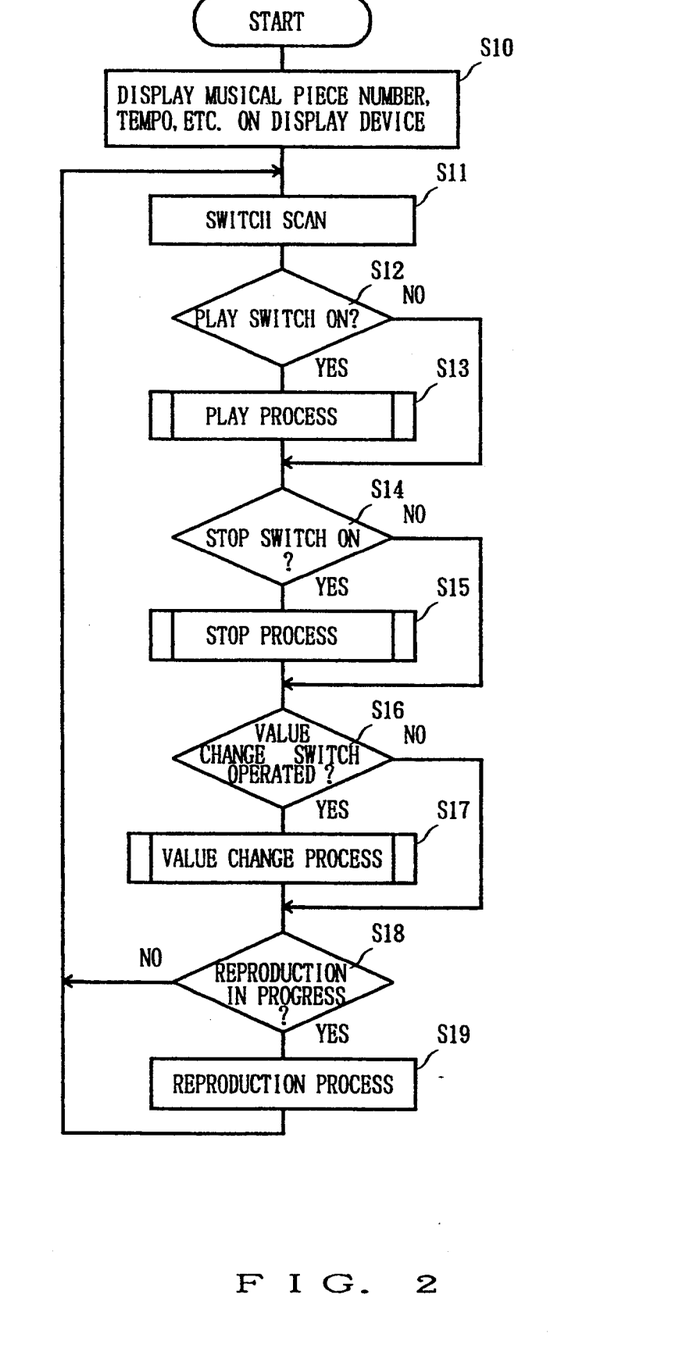
FIG. 2 is a flowchart for explaining the general operation of the embodiment of the present invention.

The flowchart in FIG. 2 graphically describes the general processing for this embodiment of the sequencer.

When a reset signal is produced at power on or upon the depression of a reset switch (not shown), the sequencer is set to its initial state, and the processing is begun. In the sequencer processing, a switch scan process is performed first (step S11).

During this process, the switch ON/OFF state information detected by the scan circuit of the operation panel 20 is fetched by the CPU 10. This information is compared with the previously fetched ON/OFF state information, stored in a predetermined area of the RAM 12, and an ON event map, wherein the only bit set is the bit that corresponds to a switch newly set to the ON state, is prepared in the RAM 12. The setting value of the value change terminal 24 is also stored in a predetermined area of the RAM 12.

Subsequently, by referring to this ON event map, a check is performed to determine whether a given switch is ON or not.

In other words, by referring to the ON event map, a check is performed to determine whether the PLAY switch 21 is ON or not (step S12). If the PLAY switch 21 is found to be ON, a PLAY process routine is called (step S13). The details of the PLAY process will be described later.

When the PLAY process is terminated, or if at step S12 the PLAY switch 21 is not ON, a check is then performed to determine whether or not the STOP switch 22 is ON (step S14). When the STOP switch 22 is found to be ON, a STOP process routine is called (step S15). The details of the STOP process will be described later.

When the STOP process is terminated, or if at step S14 the STOP switch 22 is not ON, a check is performed to determine whether a value change has been made at the value change terminal 24 (step S16). When a value change at the value change terminal 24 is found, a value change process routine is called (step S17). The details of the value change process will be described later.

When the value change process is terminated, or if at step S16 a value change at the value change terminal 24 has not been made, a check is then performed to determine whether or not reproduction is in progress (step S18). This determination is made by referring to the reproduction flag that is defined in the RAM 12. If reproduction is found to be in progress, a reproduction process is performed (step S19).

In this reproduction process, play information is read from a play information storage sector that corresponds to the musical piece identification number selected, in the musical piece identification number input field, by operation of the value change terminal 24, and is sent to an external device via the MIDI interface circuit 13. The external device thereafter produces musical tones.

When the reproduction process is terminated, or if at step S18 reproduction is not in progress, program control loops to step S11 to perform a switch scan process again. By repeating the processes at steps S11 to S19, as described above, the sequencer accomplishes its given functions.

(1) PLAY process

Figure 3:
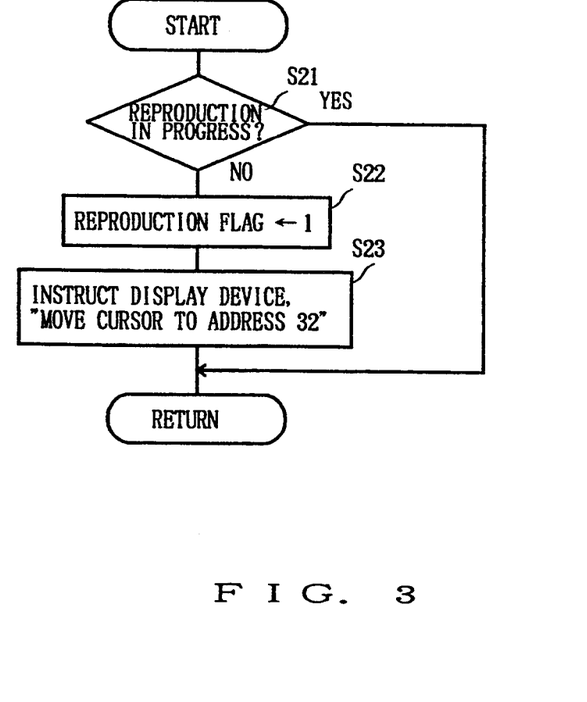
FIG. 3 is a flowchart showing a PLAY process in FIG. 2.

The PLAY process will now be explained while referring to the flowchart shown in FIG. 3. The PLAY process routine is called when depression of the PLAY switch 21 has been detected.

In the PLAY process, first, a check is performed to determine whether or not reproduction is in progress, i.e., whether or not the value of the reproduction flag is "1" (step S21). If reproduction is found to be in progress, it is assumed that the PLAY switch 21 has been depressed during the reproduction, and program control returns from the PLAY process routine without performing the other processes. In other words, depression of the PLAY switch 21 during reproduction is disregarded.

If, at step S21, reproduction is not in progress, the reproduction flag is set to "1" (step S22). Then, a command to move the cursor 45 to address 32 on the display device 25 is sent to the display device 25 (step S23). Following this, program control returns from the PLAY process routine.

As described above, when the PLAY switch 21 has been depressed while reproduction is not in progress, i.e., while reproduction is stopped, the cursor 45 is moved and located at the least significant digit position in the field 44 where a tempo value is displayed, i.e., at address 32 on the display device 25.

In order to perform reproduction, the process of selecting a tempo is normally performed in the reproduction hold state by depressing the PLAY switch 21. Conventionally, even after a sequencer is set to the reproduction hold state by depression of its PLAY switch, the cursor remains at its previously set position (e.g., a field for displaying a musical piece identification number); and before a desired tempo value can be set using a value change terminal, an operator must first use a cursor positioning switch to move the cursor to a field employed for displaying a tempo value.

According to the above described embodiment of the present invention, however, when an operator sets the sequencer to the reproduction hold state by depression of the PLAY switch 21, the cursor 45 is automatically relocated to the least significant digit position in the tempo value field 44. This eliminates the need to use the cursor positioning switch 23 and facilitates tempo changes, and is intended to simplify operation of the sequencer and to accelerate information setup operations.

(2) STOP process

Figure 4:
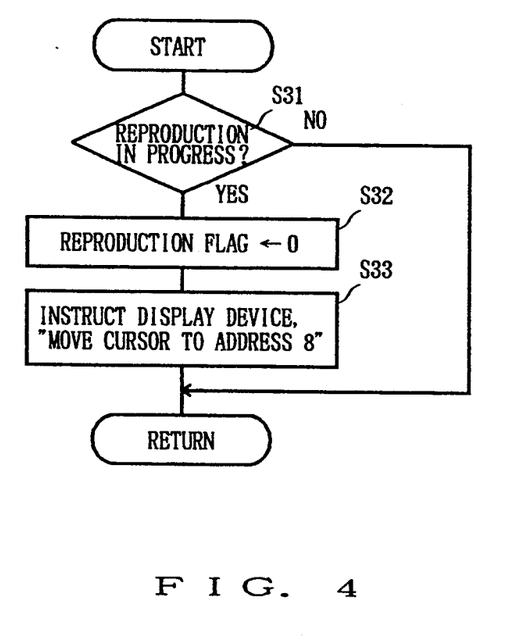
FIG. 4 is a flowchart showing a STOP process in FIG. 2.

The STOP process will now be explained while referring to the flowchart shown in FIG. 4. The STOP process routine is called when depression of the STOP switch 22 has been detected.

In the STOP process, first, a check is performed to determine whether or not reproduction is in progress, i.e., whether or not the value of the reproduction flag is "1" (step S31). If reproduction is not in progress, it is assumed that the STOP switch 22 has been depressed while reproduction is stopped, and program control returns from the STOP process routine without performing the other processes. In other words, depression of the STOP switch 22 during reproduction stop is disregarded.

If, at step S31, reproduction is in progress, the reproduction flag is cleared to "0" (step S32). Then, a command to move the cursor 45 to address 8 on the display device 25 is sent to the display device 25 (step S33). Following this, program control returns from the STOP process routine.

As described above, when the STOP switch 22 has been depressed during reproduction, the cursor 45 is moved and located at the least significant digit position in the field 41 where a musical piece identification number is displayed, i.e., at address 8 on the display device 25.

After reproduction is stopped, normally the process of selecting the next musical piece is performed. Conventionally, even after reproduction is stopped by depression of the STOP switch, the cursor remains at its previously set position (e.g., a field for displaying a tempo value); and before a desired musical piece identification number can be set using an operation terminal, an operator must first use a cursor positioning switch to move the cursor to a field employed for displaying a musical piece identification number.

According to the above described embodiment of the present invention, however, when an operator stops the reproduction by depression of the STOP switch 22, the cursor 45 is automatically relocated to the least significant digit position in the musical piece identification number field 41. This eliminates the need to use the cursor positioning switch 23 and facilitates musical piece identification number changes, and is intended to simplify operation of the sequencer and to accelerate information setup operations.

(3) Value change process

Figure 5:
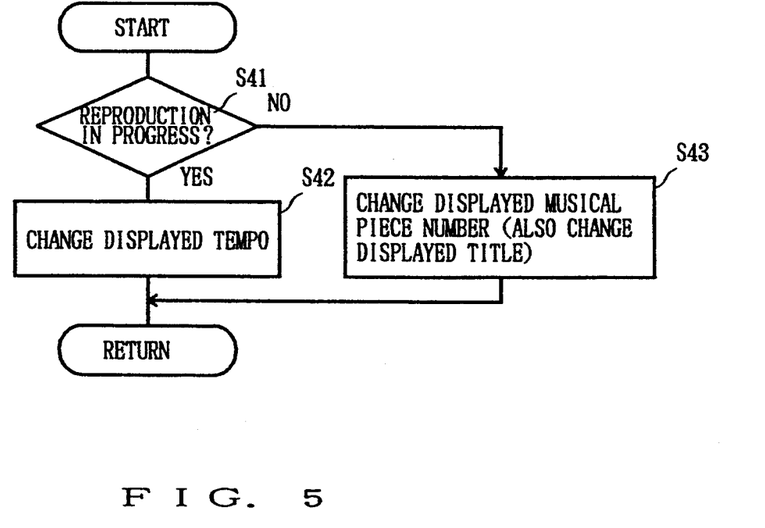
FIG. 5 is a flowchart showing a value change process in FIG. 2.

The value change process will now be explained while referring to the flowchart shown in FIG. 5. The value change process routine is called when manipulation of the value change terminal 24 has been detected.

In the value change process, first, a check is performed to determine whether or not reproduction is in progress, i.e., whether or not the value of the reproduction flag is "1" (step S41). If reproduction is found to be in progress, it is assumed that the PLAY switch 21 has been depressed and that the cursor 45 is located at the least significant digit position in the field 44 where a tempo value is displayed, and the displayed tempo is changed (step S42).

More specifically, in agreement with the change by the value change terminal 24, the current tempo value that is stored in the RAM 12 is changed, and the updated value is sent to and displayed in the field 44 on the display device 25. Based on the updated tempo value which is stored in the RAM 12, musical tones are reproduced.

If, at step S41, reproduction is not in progress, it is assumed that the STOP switch 22 is depressed and that the cursor 45 is located at the least significant digit position in the field 41 where a musical piece identification number is displayed, and the displayed musical piece identification number is changed (step S43).

More specifically, in agreement with the change by the value change terminal 24, the current musical piece identification number that is stored in the RAM 12 is changed, and the updated data is sent to the field 41 on the display device 25. Accordingly, the musical piece identification number is changed, and the reproduction process at step S19 in FIG. 2 is performed using the updated musical piece identification number that is stored in the RAM 12.

During the selection of a new musical piece identification number, a music title displayed in the field 42 can also be changed in agreement with the new musical piece identification number.

As described above, according to this embodiment, when a display device having multiple data input fields is employed for the input of specific information items to a sequencer, a cursor is repositioned to an input field where, in the current operation mode, information will most probably be entered (i.e., in the above embodiment, during reproduction, when the STOP switch 22 is depressed, to the musical piece identification number input field; during reproduction stop, when the PLAY switch 21 is depressed, to the tempo value input field).

Since an operator does not have to move a cursor to a desired input field, the number of switch operations, etc. is reduced and a variety of information items can be easily and rapidly set up.

Although for the above described embodiment the examples presented cover only the changing of musical piece identification numbers and tempo values, the processes can be modified to provide for the changing of additional, or other, information items and the same results, and effects, as in the described embodiment, can be obtained.

According to this invention, in short, a sequencer automatically positions a cursor at an input field where information will most probably be changed in a given operation mode, and thereby provides an easy and fast information setting operation.

As described above in detail, according to the present invention, it is possible to provide a sequencer which decreases switch operations, etc. as much as possible, and thus performs various information setups easily and rapidly.

What is claimed is:

1. In a sequencer having operation modes comprising a music reproduction mode and a stop mode for controlling an external device for playing music, said sequencer employing alterable musical information items defining tempo and musical piece identification parameters for the music played by the device in said music reproduction mode, there being a given one of the musical information items most likely to be altered in conjunction with a given change in the operation mode of the device, the improvement comprising:

display means for receiving and displaying said tempo and musical piece identification information items inputted thereto, said display means having multiple data input fields, each of said data input fields displaying one of said information items, said display means having indicating means for selectively indicating the data input field to which new data relating to an information item may be inputted and displayed;

designating means for selecting a given operation mode of said sequencer; and control means coupled to said designating means for controlling the operation of the external device in accordance with the operation mode selected by said designating means, said control means having a play control means and a stop control means controlling the playing of music, said control means being coupled to said display means for causing said indicating means to indicate the data input field relating to tempo when said play control means is operated but the external device is not playing music and for preventing operation of said indicating means when the play control means is operated when the external device is playing music; and said control means causing said indicating means to indicate the data input field relating to musical piece identification when the stop control means is operated when the external device is playing music.

2. The improved sequencer of claim 1 further including means for altering the information contained in the information items indicated by said indicating means.

3. The improved sequencer of claim 1 further including memory means for storing said information items.

4. The improved sequencer of claim 3 wherein said memory means stores musical information items relating to pieces.

5. The improved sequencer of claim 1 wherein the operation modes further include a value change mode, wherein said control means has a value change control means further controlling the playing of music, said control means causing said indicating means to indicate the data input field relating to tempo when the value change control means is operated when the external device is playing music, said control means causing said indicating means to indicate the data input field relating to musical piece identification when the value change control means is operated but the external device is not playing music.

* * * * *